United States Patent [19]
Kitchen

[11] 4,408,215
[45] Oct. 4, 1983

[54] ELECTROCHEMICAL MARKING APPARATUS

[75] Inventor: William D. Kitchen, Utica, N.Y.

[73] Assignee: Electromark, division of Mohawk International Inc., Utica, N.Y.

[21] Appl. No.: 220,844

[22] Filed: Dec. 29, 1980

[51] Int. Cl.$^3$ .............................................. G01D 15/06
[52] U.S. Cl. ............................ 346/165; 101/DIG. 13
[58] Field of Search .................. 346/139 C, 141, 155, 346/162–165; 358/300; 101/DIG. 13, 93.04

[56] References Cited
U.S. PATENT DOCUMENTS 2,971,810  2/1961  Ressler .................................. 346/165
3,010,883  11/1961  Johnson et al. .................. 346/165 X

*Primary Examiner*—Thomas H. Tarcza
*Attorney, Agent, or Firm*—Bruns & Jenney

[57] ABSTRACT

Apparatus for selectively marking the surface of a grounded conductive part using a known electrochemical marking process. The apparatus includes a writing head having a plurality of aligned digital modules mounted therein. Each module is made up of a series of electrodes that can be independently fired to create different electrical patterns. A dielectric stencil is placed between the part and the marking head that has grid lines cut therein which overlie each of the modules and serve to shape the electrical current passing through the stencil. By selectively firing the electrodes, different alpha-numeric characters can be recorded upon the receiving surface of the part without changing the stencil.

10 Claims, 3 Drawing Figures

4,408,215

ELECTROCHEMICAL MARKING APPARATUS

BACKGROUND OF THE INVENTION

This invention relates to improved apparatus for marking conductive parts and, in particular, to apparatus for selectively recording alpha-numeric characters upon conductive parts using an electrochemical marking technique.

In the electrochemical marking process, a grounded conductive part is marked by firing an electrode through a stencil in the presence of an electrolyte so that the electrical current reaching the receiving surface of the part is shaped by the stencil design. As a result, a latent electrical image of the design is recorded upon the receiving surface of the part. Under the influence of the electrolyte, an etch is formed within the imaged area and, at the same time, an oxide of the base metal is deposited in the etched regions to create a relatively darker and thus clearly visible mark. The electrochemical marking process does not deform or otherwise harm the receiving part. Similarly, because it is clean and easy to use and also provides a permanent mark, the process has found widespread use in industry.

Heretofore, in the practice of the electrochemical marking process, it has been necessary to cut a new stencil every time recorded data placed upon the part changed. In the situation where different identification or serial numbers were to be placed on parts, a large number of stencils were required. Handling of the stencils was an extremely difficult and time-consuming procedure. Similarly, the process was susceptible to human error which resulted in parts being mismarked. Correcting this type of error oftentimes resulted in the scraping of the part or having to remark it. In any case, correcting marking errors is a generally expensive proposition.

SUMMARY OF THE INVENTION

It is therefore a primary object of this invention to extend the usefulness of equipment for electrochemically recording data upon conductive parts.

A further object of the present invention is to change the information recorded upon a conductive part by an electrochemical marking device without having to change the marking stencil.

A still further object of the present invention is to provide an electrochemical marking device that can be selectively energized to record selected alpha-numeric information upon a receiving surface.

Another object of the present invention is to improve the efficiency of the electrochemical marking process.

Yet another object of the present invention is to simplify procedures by which serial numbers are electrochemically recorded upon conductive parts.

While a still further object of the present invention is to provide an electrochemical marking device having a plurality of digital modules that can be selectively fired through a specially prepared stencil to record desired numbers and/or letters upon a conductive part.

These and other objects of the present invention are attained by an apparatus for electrochemically marking a receiving surface of a grounded conductive part that includes a writing head having at least one digital module containing a series of electrodes that can be fired individually to create different electrical patterns. A stencil is placed between the module and the part to be marked which has a lined grid cut therein capable of shaping the current passing between the electrodes and the part into alpha-numeric characters. By selectively firing the electrodes, different numbers and/or letters are recorded upon the receiving surface of the part.

BRIEF DESCRIPTION OF THE DRAWINGS

For a better understanding of these and other objects of the present invention reference is had to the following detailed description of the invention which is to be read in conjunction with the accompanying drawings, wherein.

DESCRIPTION OF THE INVENTION

The apparatus of the present invention employs the well-known electrochemical marking process to record information upon a grounded conductive part. In this process, a low voltage, low ampere current is passed between an electrode and the part that is being marked. The electrical field is shaped by means of a dielectric stencil that is positioned between the electrode and the part whereby a latent electrical image, which is a replica of the design cut in the stencil, is recorded upon the receiving surface of the part. The latent image is developed or made visible by wetting the receiving surface with an electrolyte while it is being imaged. An electrochemical reaction takes place that produces a clearly visible image of the recorded information.

As will be explained in greater detail below, the apparatus of the present invention permits information recorded by the electrochemical process to be selectively changed without the need of changing stencils. This feature, among other things, permits serial numbers to be sequentially placed upon parts in an ordered arrangement whereby each individual part will bear a different identification number.

Figure 1:
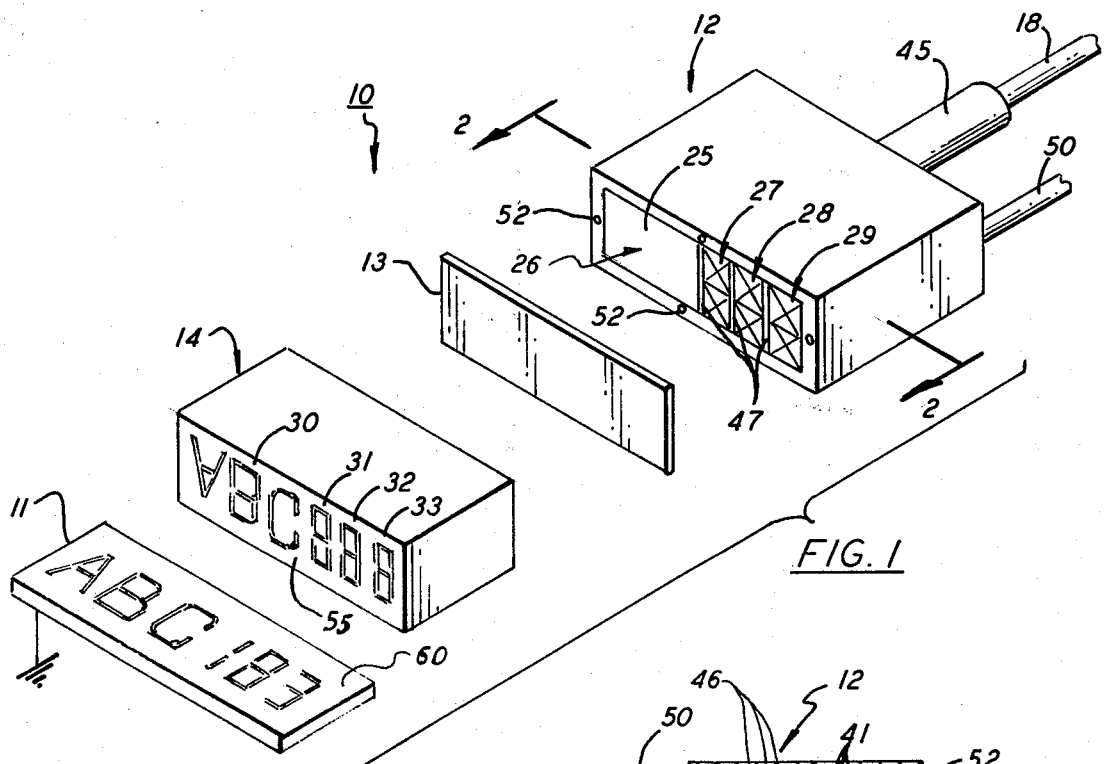
FIG. 1 is an exploded view in perspective showing the component parts of a marking device embodying the teachings of the present invention.
Figure 3:
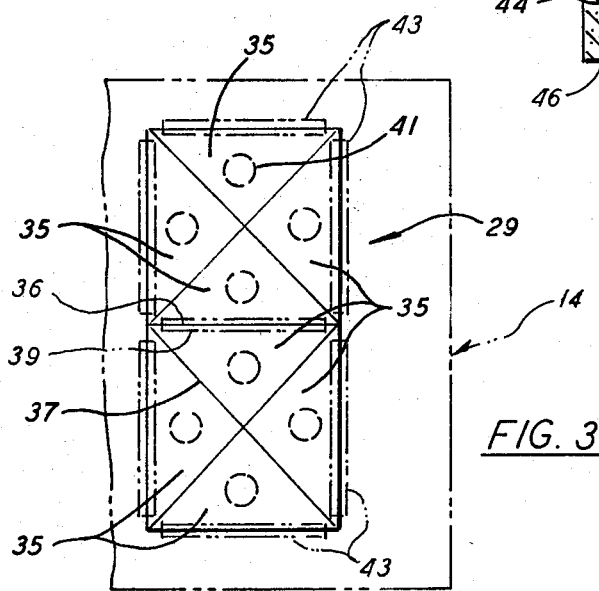
FIG. 3 is an enlarged end view of a digital display module made up of eight triangular-shaped electrodes that is suitable for use in the practice of the present invention.

Referring now to the drawings and, in particular, to FIG. 1, the apparatus of the present invention is generally referenced 10 and includes a writing head 12, a wicking pad 13 and stencil 14. Although not shown, the writing head is electrically connected to a power supply by means of an electrical harness 18 that is adapted to apply current to a number of electrodes contained within the head. Although any suitable electrode arrangement may be used in the practice of the present invention, the electrodes utilized in the present embodiment of the invention include a relatively large one-piece marking block unit 25 and three smaller digital module units generally referenced 27–29. Each module unit contains eight triangular-shaped electrodes that are brought together as illustrated in FIG. 3 to provide a rectangular-shaped assemblage.

Figure 2:
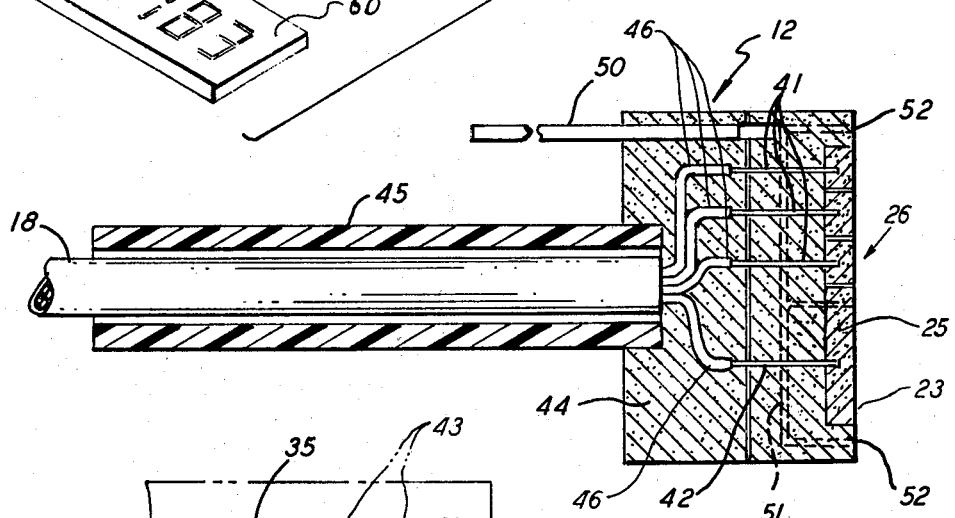
FIG. 2 is an enlarged, top elevation in section of a writing head suitable for use in the practice of the present invention taken along lines 2—2 in FIG. 1.

Preferably, each of the electrodes is a carbon element that is treated to make it relatively impervious to most liquids. Carbon is the preferred material because it is an excellent conductor and it does not corrode or otherwise break down electrically or mechanically when exposed to harsh solvents and chemicals that are used in many industrial machining and cleaning operations. The distal end of each rod is machined to provide a flat end face which enables the ends of the electrodes to be aligned in assembly within a common plane that describes the working surface 23 (FIG. 2) of the writing head. A wire 41 is embedded in the proximal end of each electrode. The leads are connected to harness 18 by means of electrical connectors 46—46. By means of the leads, each of the electrodes situated in the writing head is able to be individually fired to generate different electrical patterns.

The side walls of the electrodes are provided with a thin dielectric coating that forms an electrical barrier 37 (FIG. 3) between the electrodes. Preferably the barrier is formed by a bakelite coating that is between 0.001 and 0.003 inches thick. A polymer barrier made up of one part Butyl Acetate, two parts Nitrocellulose and one part Dibutyl Phtalate has been tested and found to exhibit good corrosion resistance and dielectric characteristics. Plasma sprayed ceramic coatings, such as alumina, have also been tested and were shown to have good dielectric properties and a high degree of stability under various operating conditions. The coated electrodes making up the digital modules are bonded together in assembly. An epoxy cement is used to provide a secure and permanent bond therebetween.

After each module is assembled, and the bonding cement is set, the units are cojoined with the marking block unit to form an electrode subassembly, generally referenced 26. As illustrated in FIG. 1, nonconductive spacers 47—47, which are preferably made of Mica, are positioned between the electrode units to establish both an electrical and a physical barrier therebetween. The spacers are bonded to the units using a high strength epoxy cement. As previously noted, the units are assembled so that the flat end face at the distal end of each electrode lies in a common plane 23.

The electrode subassembly is placed face down in the bottom of a mold and an epoxy resin is poured around the electrode units to encapsulate them in the resin. The wire leads are brought out of the encapsulating material and the resin permitted to cure. After the resin has set, the leads are connected to the harness and a plastic sleeve 45 is passed over the harness. The end of the sleeve is brought down close to the top of the previously poured encapsulating structure and the entire assembly returned to the mold. A final encapsulating layer of epoxy resin is poured over the first which further encapsulates the harness sleeve and the wire connectors within a single, open-faced housing 44.

An electrolyte flow network is cast directly in the epoxy resin housing which enables a continuous supply of electrolyte to be brought to the working surface of the writing head. The flow network contains a series of interconnected flow channels. These include a supply tube 50 for introducing electrolyte from a supply (not shown) into the housing, and a series of laterally extended distribution lines 51 that feed into a number of discharge lines 52. The discharge lines terminate in feeder ports that are strategically located about the working surface of the writing head adjacent to the electrode subassembly.

In assembly, the wicking pad is placed against the working surface of the writing head. The pad covers both the electrode subassembly and the electrolyte discharge ports. The pad is fabricated of a material that is capable of drawing electrolyte from the ports and bringing the liquid across the face of the electrodes via capillary action to keep the surface region of the electrodes wetted during the marking process. Liquid is thus automatically metered by the pad from the supply reservoir to the imaging region of the marking device.

The stencil 14 is cut from a dielectric sheet of material and is formed into an open-ended cap that slips over both the wicking pad and the housing section of the writing head. A close sliding fit is provided between the stencil cap and the writing head housing so that the stencil will remain in place once it is passed over the housing. A design is cut into the face 55 of the stencil that contains two sections. The first section is situated on the left-hand side of the face as viewed in FIG. 1 and, in assembly, overlies the one piece marking block 25. The second section is situated on the right-hand side of the stencil and overlies the three digital modules 27-29. Typically, permanent information, such as a company logo or the like, will be cut in the first section of the stencil which, in the present embodiment, is represented by three mirror reading letters 30. The second section of the stencil has three seven segment grid patterns cut therein with each grid pattern arranged so that it is situated over one of the modular electrode units. The grid patterns, which are numbered 31-33 in FIG. 1, are made up of lines 43—43 or elongated slots that are cut in the stencil face in a figure eight configuration. From this pattern design the numbers 0-9 and many letters of the alphabet can be generated by selectively accenting one set of line in deference to the others. In the practice of the present invention, the grid lines are selectively accented by firing the electrodes in a selected pattern through the stencil.

As illustrated in phantom outline in FIG. 3, the lines 43—43 that make up the stencil grid pattern are arranged to encompass the outer margins of the digital module and to cover the parting line 36 separating the two centrally located electrodes. The wire leads that are connected to the two central electrodes are shorted together to permit the electrodes to fire in unison when an energizing current is applied thereto. Electrically, the middle two electrodes thus represent a single electrode situated beneath the midline 39 of the grid. Accordingly, a single electrode is situated beneath each of the lines in the overlying grid pattern. By firing the electrodes in a predetermined format, the electrical current flowing between the writing head and the grounded imaging surface, as for example, the surface 60 of plate 11, will be selectively contoured as it passes through the stencil to record an image of the desired number or letter upon the receiving surface. Selective firing of the electrodes is achieved by placing either a mechanicam or electronic control switch in each of the electrode leads.

In the present embodiment of the invention, wherein three digital modules are utilized, numbers ranging between 000 and 999 can be selectively written upon the plate by firing the electrodes in a programed order. At the same time as the modules are fired, the one-piece block 25 is also fired whereupon the permanent information along with the selectably changeable information is recorded simultaneously upon the plate.

As should be evident from the disclosure above, the apparatus of the present invention is not limited to the three digit module arrangement as herein depicted and any number of modules may be similarly employed without departing from the teaching of the present invention. Similarly, the seven bit format cut into the stencil may also be changed to any suitable arrangement of openings from which different numbers or letters can be created by selectively firing rods positioned behind the openings as described above.

While this invention has been described with reference to the details as set forth above, it is not limited to the specific structure as disclosed and the invention is intended to cover any modifications or changes as may come within the scope of the following claims.

I claim:

1. Apparatus for electrochemically marking a grounded conductive part that includes
    a dielectric stencil having a front face for being positioned adjacent to a grounded conductive part and further includes a series of slotted openings passing therethrough to create at least one seven bit character generating format,
    an electroded head positioned behind the stencil having an electrically isolated elongated electrode overlying each of the slotted openings in the stencil,
    electrical means for independently firing each of the electrodes whereby a preselected character is electrically imaged upon the surface of said part, and
    wicking means positioned between the electroded head and said part for wetting the part with an electrolyte for developing the electrical image recorded on the part.

2. The apparatus of claim 1 that further includes a plurality of seven bit character generating formats formed in the stencil whereby a number of characters are similtaneously recorded on the part.

3. The apparatus of claim 1 wherein the wicking means includes a pad for metering an electrolyte into the imaged region.

4. Apparatus for marking a grounded conductive metal part that includes
    a dielectric stencil having an imaging face which is placed in contact with a surface to be marked,
    said stencil further including at least one alpha-numerical line pattern cut in said imaging face, said pattern having a rectangular figure eight format that includes an upper line positioned along the top horizontal margin of the pattern, a lower line positioned along the bottom horizontal margin of the pattern, a first pair of coaligned lines positioned along one vertical side margin of the pattern, a second pair of coaligned lines positioned along the other vertical side margin of the pattern, and a horizontal line positioned about midway between the upper and lower lines,
    a writing head positioned behind the stencil having a plurality of conductive electrodes arranged so that at least one of said electrodes is situated behind a companion line cut in the stencil,
    dielectric means for electrically isolating the electrodes from each other,
    electrical means for firing each of the electrodes independently through said stencil whereby selected alpha-numerical characters are electrically imaged upon the receiving surface of the part.

5. The apparatus of claim 4 wherein the stencil contains a plurality of laterally aligned alpha-numerical line patterns cut in said stencil whereby a number of characters can be recorded upon said part.

6. The apparatus of claim 5 wherein the distal end of each electrode contains a flat face with the faces being assembled in a common plane that faces the surface of the part which is marked.

7. The apparatus of claim 6 wherein the proximal end of each electrode has a wire lead connected thereto whereby each electrode can be independently fired.

8. The apparatus of claim 7 further including a dielectric means positioned between each of the electrodes to provide an electrical barrier therebetween.

9. The apparatus of claim 8 wherein the stencil further contains a design cut therein that is aligned with said alpha-numeric line patterns and said writting head further includes a wide-faced electrode positioned behind the design whereby the design is recorded upon the part when the wide-faced electrode is fired.

10. The apparatus of claim 9 that further includes metering means for bringing an electrolyte into the imaging region of the writing head for developing the image recorded upon the part.

* * * * *